United States Patent [19]

Paul et al.

[11] Patent Number: 4,735,158

[45] Date of Patent: Apr. 5, 1988

[54] PLANTING MACHINE

[75] Inventors: Lowell A. Paul, Armstrong; Alan Moss, deceased, late of Winfield, by Alan Donaldson, administrator; Bruce R. Beaty, Vernon, all of Canada

[73] Assignee: Canadian Patent and Development Limited, Ottawa, Canada

[21] Appl. No.: 855,964

[22] Filed: Apr. 25, 1986

[30] Foreign Application Priority Data

Apr. 25, 1985 [CA] Canada .................................. 480126

[51] Int. Cl.⁴ ........................ A01C 11/00; A01C 5/00
[52] U.S. Cl. .......................................... 111/2; 111/89
[58] Field of Search ...................... 111/2, 89, 90, 91, 3, 111/7.3, 7.1, 92, 93, 96, 98; 172/1

[56] References Cited

U.S. PATENT DOCUMENTS

| 411,225 | 9/1889 | Nissley et al. | 111/4 |
|---|---|---|---|
| 577,539 | 2/1897 | Speidel | 111/2 |
| 3,894,589 | 7/1975 | Ciraud | 111/89 X |
| 3,943,863 | 3/1976 | Leonard et al. | 111/89 X |
| 4,273,056 | 6/1981 | Löfgren et al. | 111/89 X |
| 4,459,924 | 7/1984 | Hassan et al. | 111/89 X |
| 4,637,328 | 1/1987 | Topham et al. | 111/89 |

FOREIGN PATENT DOCUMENTS

| 23702 | 2/1981 | European Pat. Off. | 111/89 |
|---|---|---|---|
| 497842 | 5/1980 | Fed. Rep. of Germany | 111/89 |
| 2920754 | 12/1980 | Fed. Rep. of Germany | 111/89 |
| 2140261 | 11/1984 | United Kingdom | 111/3 |

Primary Examiner—Robert E. Bagwill
Assistant Examiner—Danton D. DeMille
Attorney, Agent, or Firm—Ronald G. Bitner

[57] ABSTRACT

A planting machine for planting containerized seedlings from a moving vehicle comprising a planting tool that is pivotally supported on the vehicle. The planting tool comprises a resiliently mounted ground engaging foot, a ground penetrating probe, and a planting container advancing device having a passageway for containers. The probe is reciprocatably mounted relative to the container advancing device with means to provide horizontal displacement of the container advancing device when the probe is withdrawn such that the outlet of the container passageway is positioned over the hole made by the probe for receiving the planting container.

5 Claims, 4 Drawing Sheets

PLANTING MACHINE

BACKGROUND OF THE INVENTION

This invention relates to planting machines and particularly to an apparatus for planting containerized seedlings from a moving vehicle.

A number of mechanized planters are known for reforestation or agricultural use. For reforestation, in particular, planting is made difficult by rough terrain which causes pitching and rolling of the vehicle and includes many obstacles such as stumps and rocks. In order to provide planting at a reasonable rate, the planting device must be able to execute the planting operation rapidly while the vehicle is in motion.

SUMMARY OF THE INVENTION

An object of the present invention is to provide a planting machine that allows rapid planting of containerized seedlings with a vehicle in motion.

The planting apparatus of the present invention comprises a planting tool, a support member for pivotal connection to a vehicle and for pivotally supporting the planting tool, means for pivoting the support member about the vehicle for raising and lowering the planting tool and means for pivoting the planting tool relative to the support member. The planting tool comprises a resiliently mounted ground engaging foot, a ground penetrating probe for making a hole in the ground, and a planting container advancing device having a passageway for directing planting containers. The probe is reciprocatably mounted relative to said container advancing device with means providing horizontal displacement of the container advancing device when the probe is withdrawn from the ground such that the passageway is aligned with the hole previously made by the probe.

DETAILED DESCRIPTION OF A PREFERRED EMBODIMENT

Figure 1:
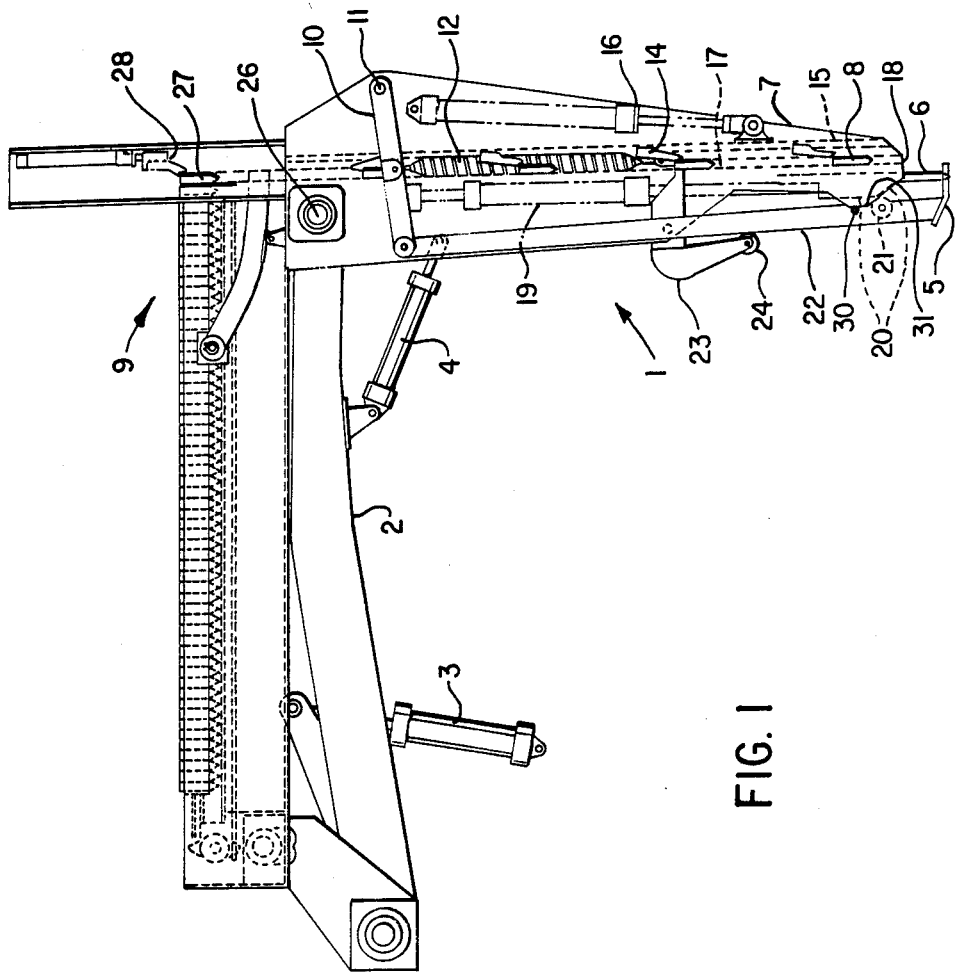
FIG. 1 is a side view of an embodiment of the planting apparatus with the planting tool shown loading the planting tool with a planting container at the beginning of the planting operation.

Referring to FIG. 1, the planting apparatus comprises a planting tool 1, with a support arm 2, pivotally connected to a vehicle (not shown) for pivotally supporting the planting tool 1. Hydraulic cylinders 3 and 4 provide means for raising and lowering the planting tool 1 and pivoting the planting tool relative to the support arm 2, respectively.

The planting tool 1 comprises a ground engaging foot 5, a ground penetrating probe 6, a planting container advancing device 7 supplied with containers 8 by a container dispenser 9.

The foot 5 is resiliently mounted for longitudinal motion relative to the planting tool 1 by means of an arm 10 pivotally connected to the tool 1 at 11 and biased downwardly by spring 12.

The container advancing device 7 includes container engaging elements 14 mounted on a reciprocatable carriage 15 driven by hydraulic cylinder 16, and a passageway 17 through which the containers pass and exit at outlet 18.

The probe 6 is reciprocatable relative to the container advancing device 7 by means of hydraulic cylinder 19. Cam means allows horizontal displacement of the container advancing device 7 along with the probe 6, when the probe is withdrawn. The cam means comprises a first cam surface 20 operatively connected with the probe 6 that cooperates with cam follower 22 that is fixed relative to the foot member 21, and a second cam surface 31 operatively connected with the container advancing device 7 which cooperates with cam follower 30 that is also fixed relative to the foot member 22. The pivotally mounted arm 23 has a follower 24 that rides along the foot carrying member 22 and is attached to the spring 12 which operate to bias the cam surface 20 against the cam follower 21.

Preferably, the apparatus will also include a reset cam follower 30 in combination with cam surface 31 to facilitate return of the displaced container advancing device relative to the foot member 22.

Figure 2:
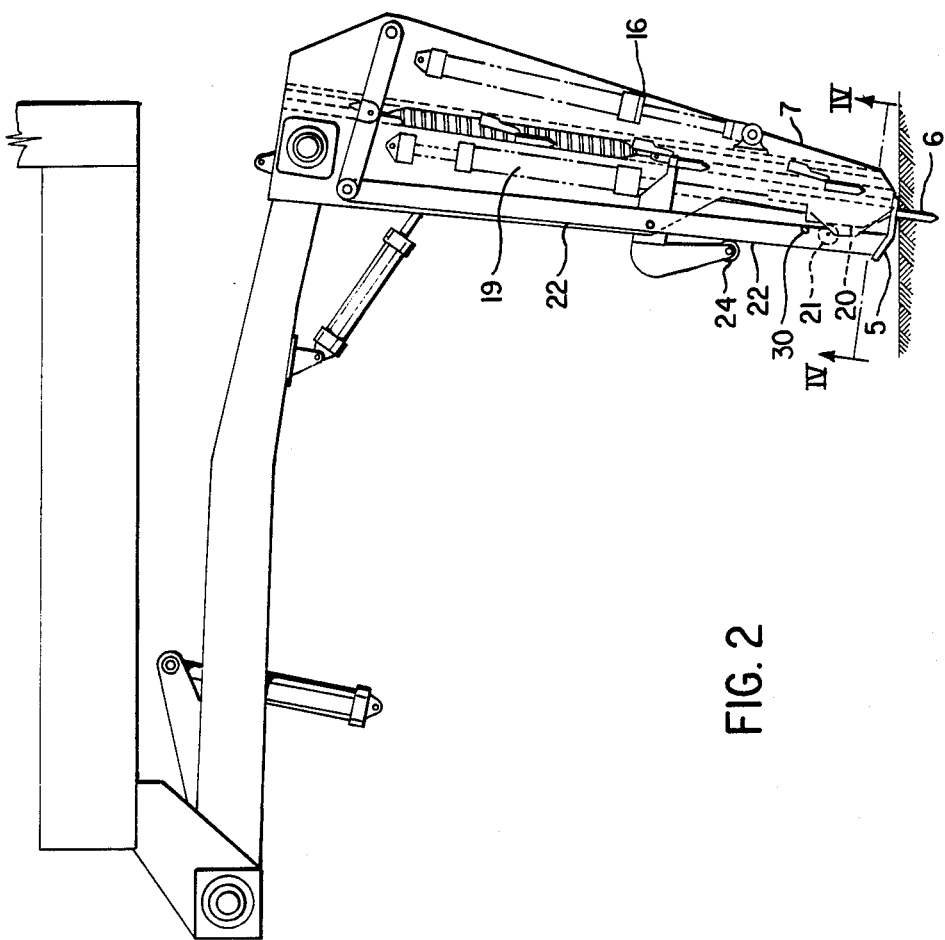
FIG. 2 shows the planting apparatus of FIG. 1 with the probe inserted.
Figure 3:
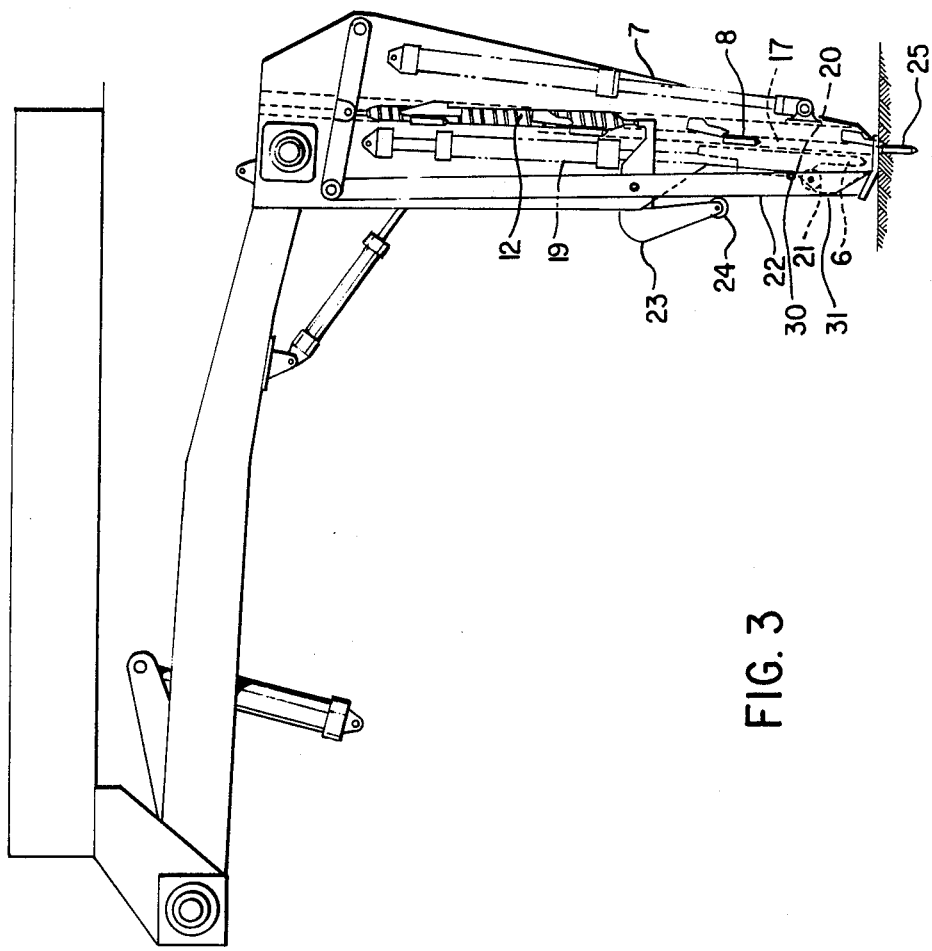
FIG. 3 shows the planting apparatus of FIG. 1 with the planting container inserted.
Figure 4:
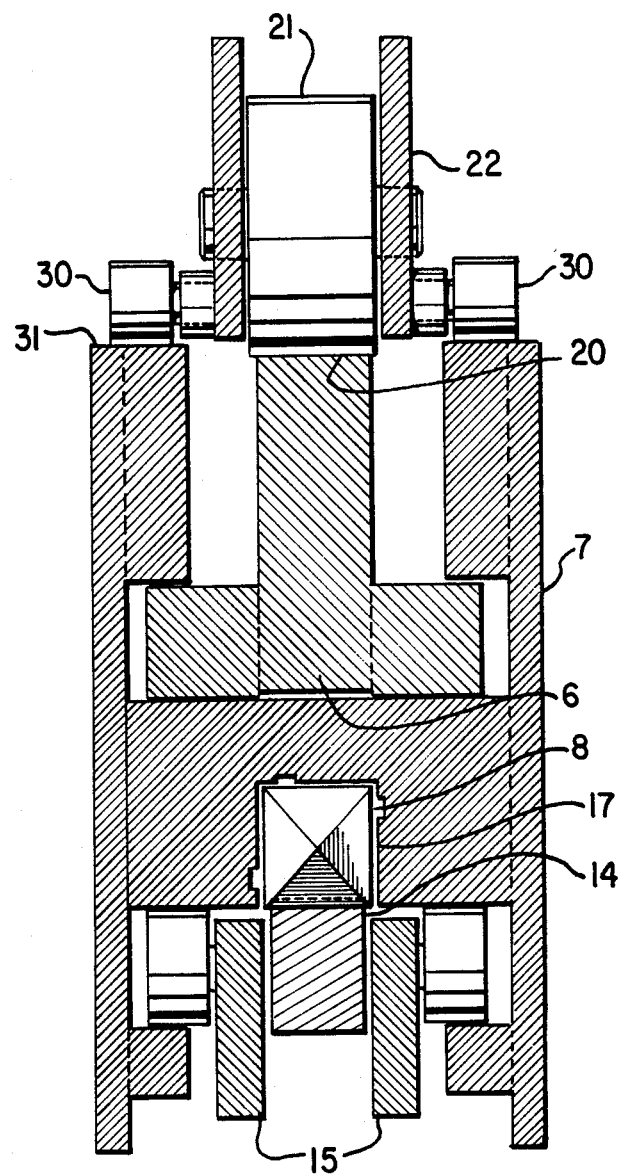
FIG. 4 is a sectional view taken at 4—4 of FIG. 2.

In operation, from the position shown in FIG. 1, the planting tool 1 is lowered by means of the hydraulic cylinder 3 causing the resilient foot 5 to engage the ground and fix the planting tool relative to the ground for the subsequent planting operation while the vehicle is in motion. Continuing downward force by cylinder 3 causes the probe 6 to move relative to the foot 5 against the force of the spring 12 and penetrate the ground as shown in FIG. 2. After penetrating the ground, the probe 6 is withdrawn by means of the hydraulic cylinder 19. Withdrawal of the probe 6, causes the container advancing device 7 to shift horizontally, due to the action of the cam surface 20 and follower 21 and spring 12, to bring the outlet 18 of passageway 17 in alignment with the hole in the ground made by the probe 6. The hydraulic cylinder 16 is hydraulically interconnected with cylinder 19 such that fluid exhausted from cylinder 19 drives cylinder 16. The hydraulic cylinder 16 drives the container 25 into the hole made by the probe, while advancing other containers 8 along the passageway 17, as shown in FIG. 3.

During the time the planting operation takes place the vehicle has moved forwardly while the foot remains fixed relative to the ground, made possible by pivoting of the planting tool 1 relative to the support arm 2 at pivot 26. During this time, both ends of cylinder 4 are ported to the exhaust to allow the planting tool 1 to pivot freely relative to the support arm 2. After the planting cycle, the planting tool is pivoted forward by means of cylinder 4 and held in position until the next cycle. A spring loaded latch may be used to keep the planting tool from pivoting until the foot strikes the ground. Both ends of the cylinder 4 are ported to exhaust as soon as the tool starts down.

When the planting tool is raised off the ground after the planting cycle, the spring 12 lowers the foot member 22 relative to container advancing device 7, and the cam surface 31 in conjunction with the cam follower 30 will shift the container advancing device 7 horizontally to return to the position shown in FIG. 1.

After the container is inserted, the planting tool 1 and support arm 2 are returned to the position as shown in FIG. 1 where a new container 27 from the dispenser 9 is advanced into the passageway 17 by advancing means 28.

It will be understood that the planting machine will be provided with a suitable control system to activate the hydraulic cylinders in the appropriate sequence for obtaining the operation described above.

Preferably, the planting machine will be provided with means to detect the force required to insert the probe into the ground and abort the planting operation, if, for example, the probe encounters a rock.

It will be understood that details of the mechanism may be altered to achieve the desired movements.

We claim:

1. A planting apparatus for a moving vehicle comprising:

a planting tool, a support member for pivotal connection to a vehicle and for pivotally supporting the planting tool, means for pivoting the support member about the vehicle for raising and lowering the planting tool and means for pivoting the planting tool relative to the support member, said planting tool comprising a resiliently mounted ground engaging foot, a ground penetrating probe for making a hole in the ground, and a planting container advancing device having a passageway for directing planting containers, said ground engaging foot being attached to a foot carrying member that is attached to the planting tool by means of a pivoting arm and biased downwardly to a position below the probe, said probe being reciprocatably mounted relative to said container advancing device, first cam means associated with the probe for providing horizontal displacement of the probe relative to the foot when the probe is withdrawn from the ground, and second cam means associated with the container advancing device for providing horizontal displacement of the container advancing device relative to the foot to a position over the hole made by the probe, when the probe is withdrawn from the ground such that the passageway is aligned with the hole previously made by the probe.

2. The apparatus of claim 1 wherein each of the first and second cam means comprises a cooperating cam and cam follower.

3. The apparatus of claim 1 wherein the foot carrying member is resiliently biased towards the planting tool.

4. The apparatus of claim 1 wherein the probe and container advancing device are hydraulically interconnected such that the probe is retracted as the container advancing device advances a container.

5. The apparatus of claim 1 further comprising a container dispenser for feeding planting containers in to the passageway of the container advancing device.

* * * * *